Aug. 9, 1949.                W. S. WATTS ET AL                2,478,647
                       COMBINED ROAD AND RAIL VEHICLE
Filed July 15, 1944                                     6 Sheets-Sheet 2
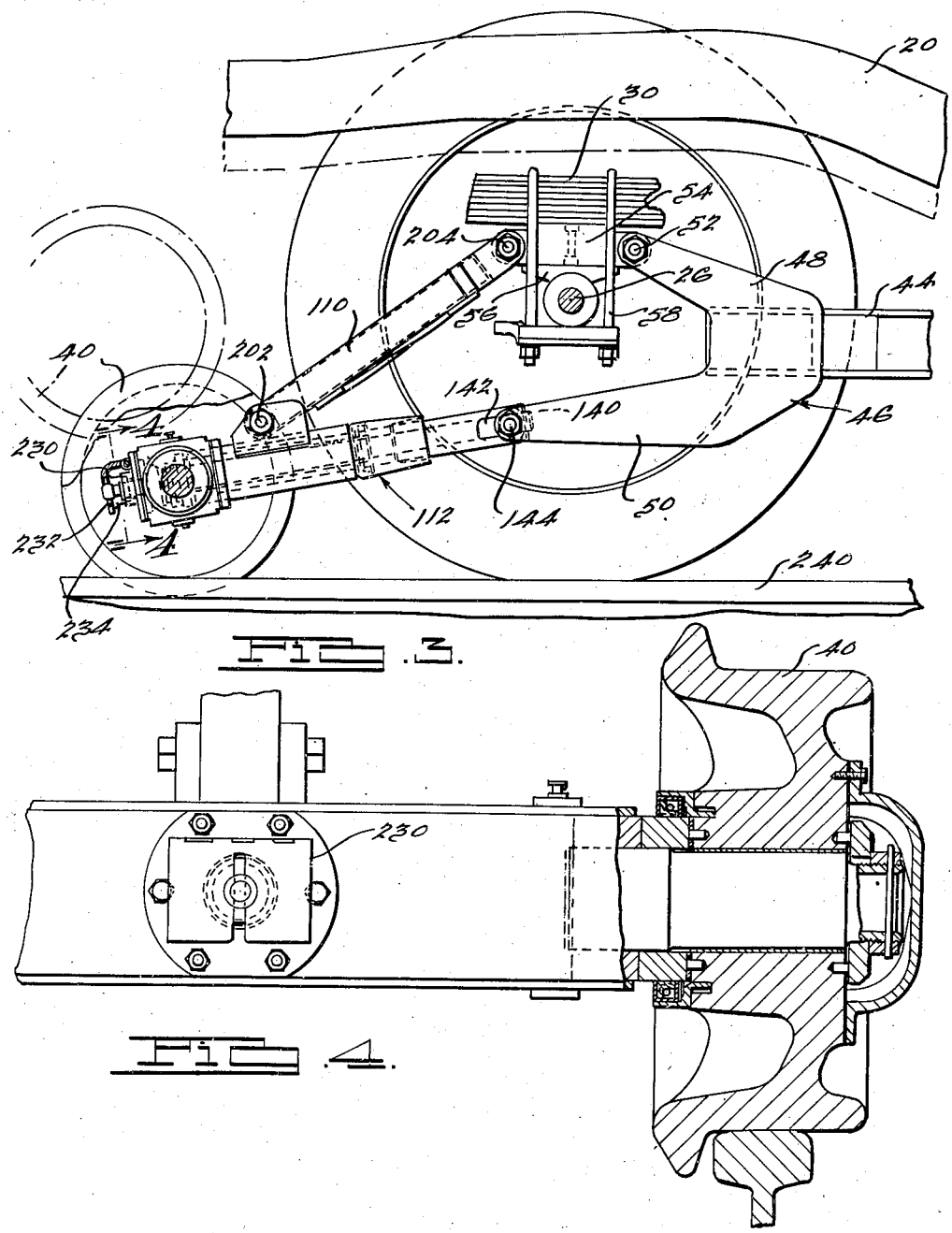
INVENTORS.
William S. Watts,
Charles S. Davidson.
BY
Harness, Dickey & Pierce.
ATTORNEYS.

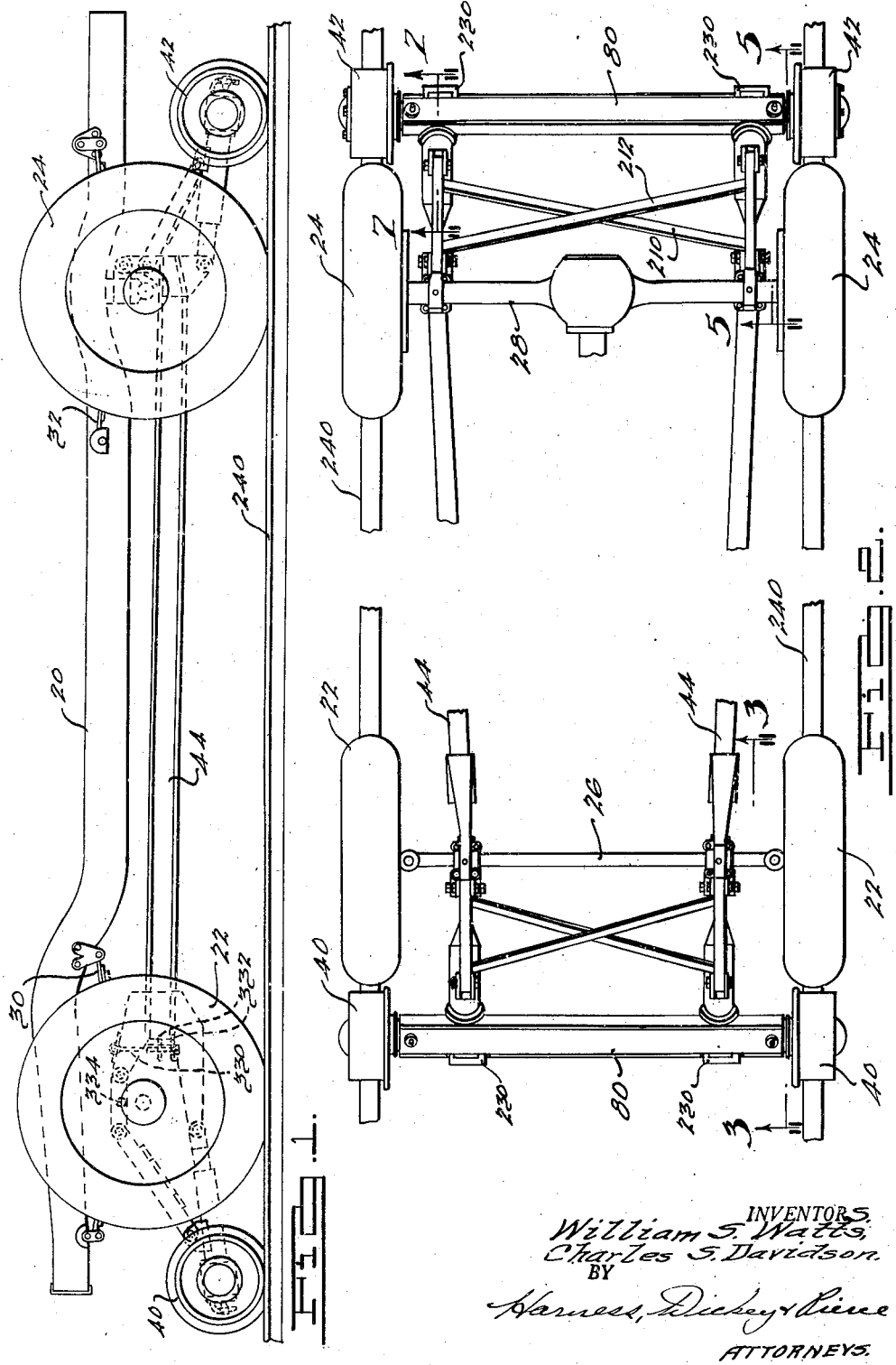

Aug. 9, 1949.  W. S. WATTS ET AL  2,478,647
COMBINED ROAD AND RAIL VEHICLE
Filed July 15, 1944  6 Sheets-Sheet 3
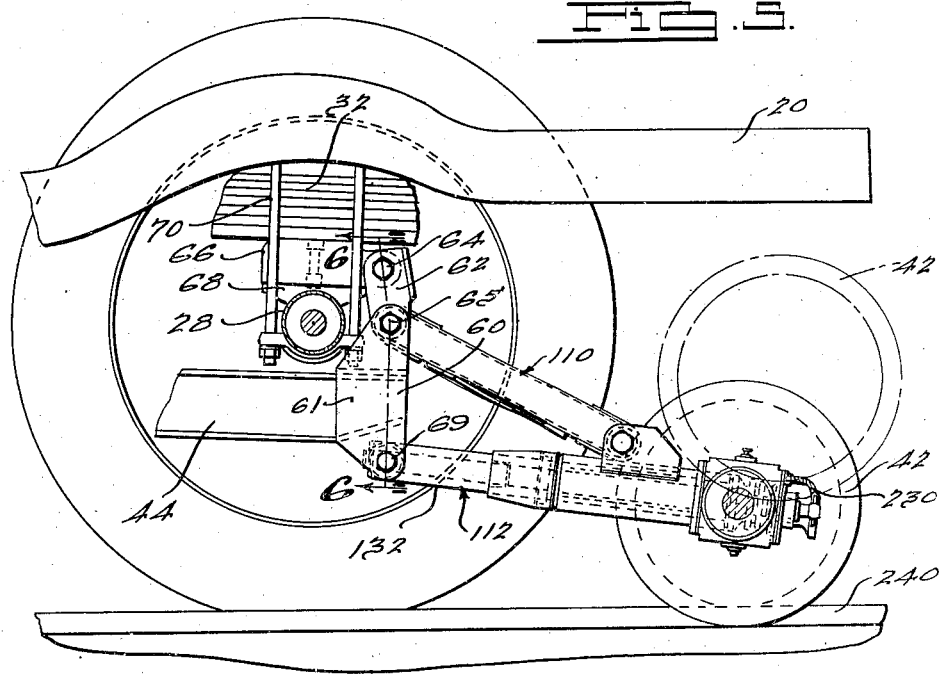
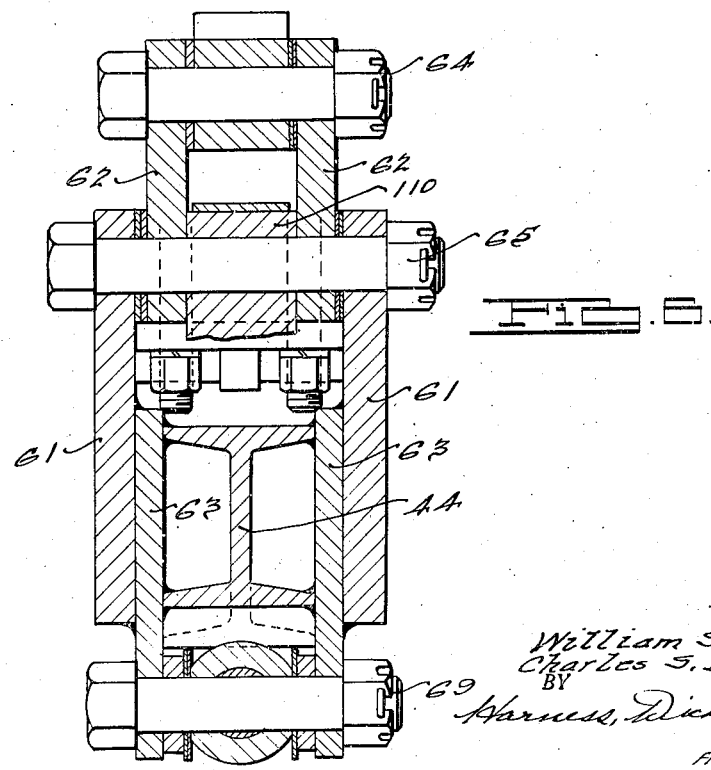
INVENTORS.
William S. Watts,
Charles S. Davidson.
BY
Harness, Dickey & Pierce
ATTORNEYS Aug. 9, 1949.　　　W. S. WATTS ET AL　　　2,478,647
COMBINED ROAD AND RAIL VEHICLE
Filed July 15, 1944　　　　　　　　　　6 Sheets-Sheet 4
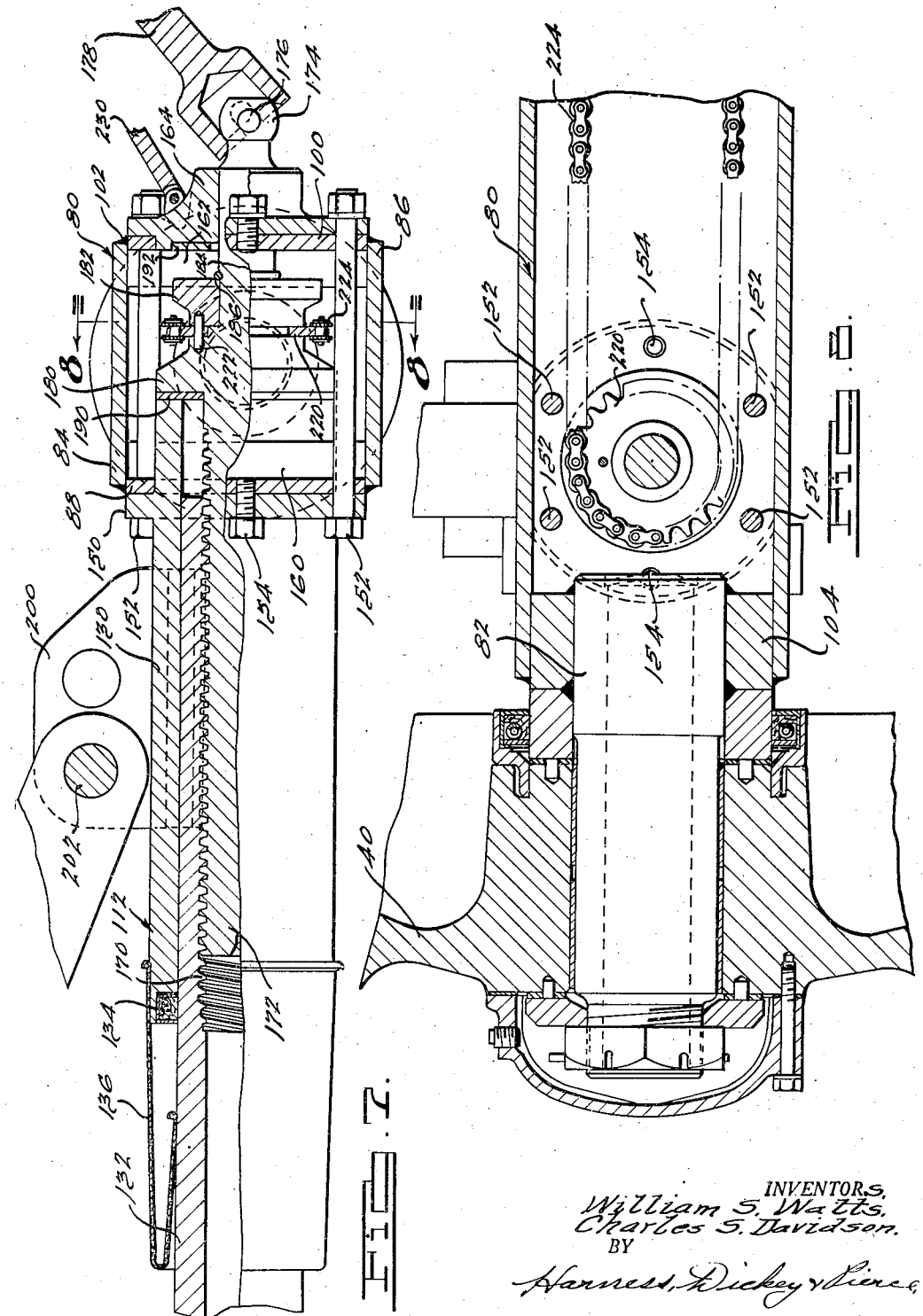
INVENTORS,
William S. Watts,
Charles S. Davidson.
BY
Harness, Dickey & Pierce
ATTORNEYS.

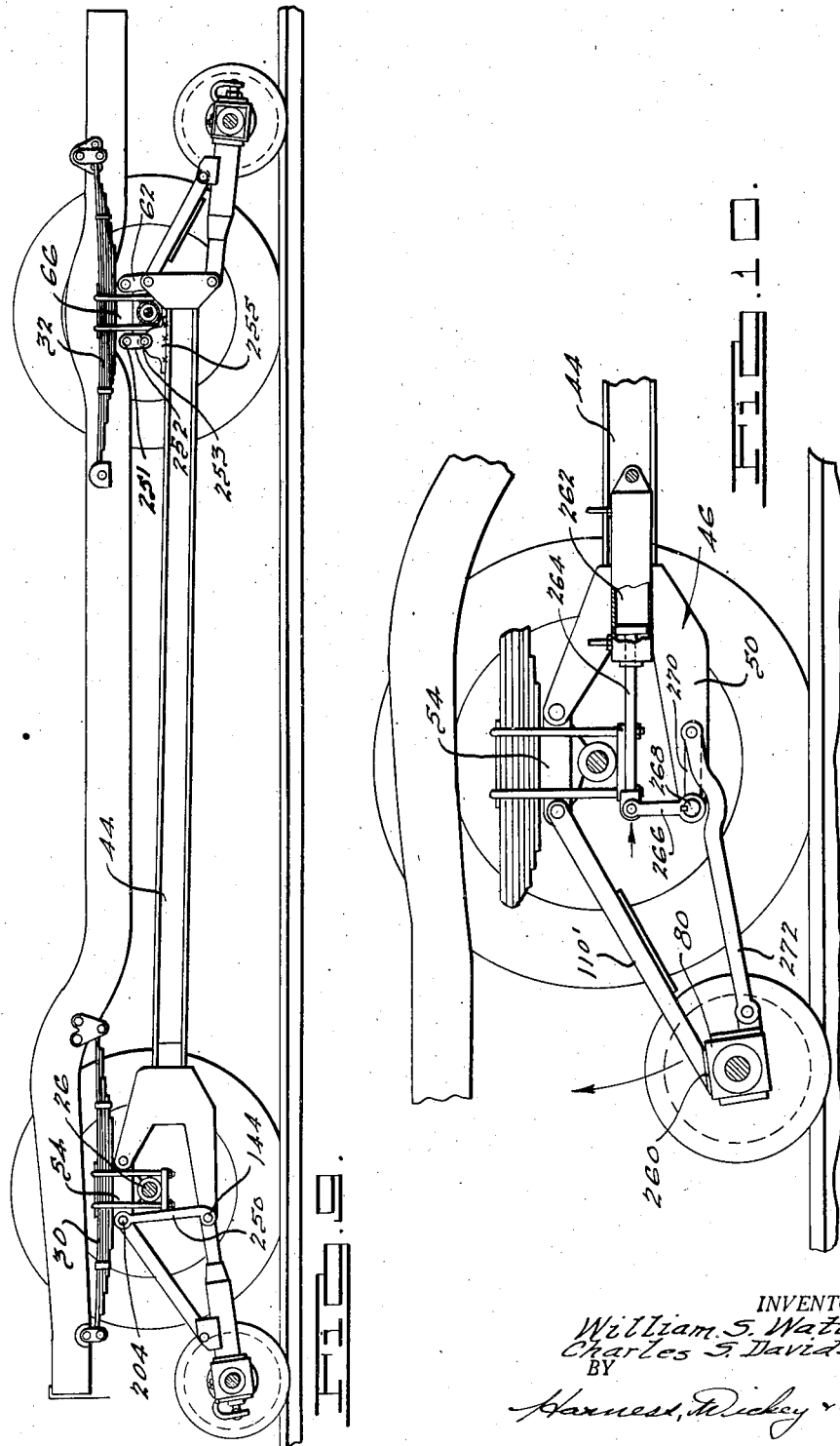

Aug. 9, 1949.  W. S. WATTS ET AL  2,478,647
COMBINED ROAD AND RAIL VEHICLE
Filed July 15, 1944  6 Sheets-Sheet 6
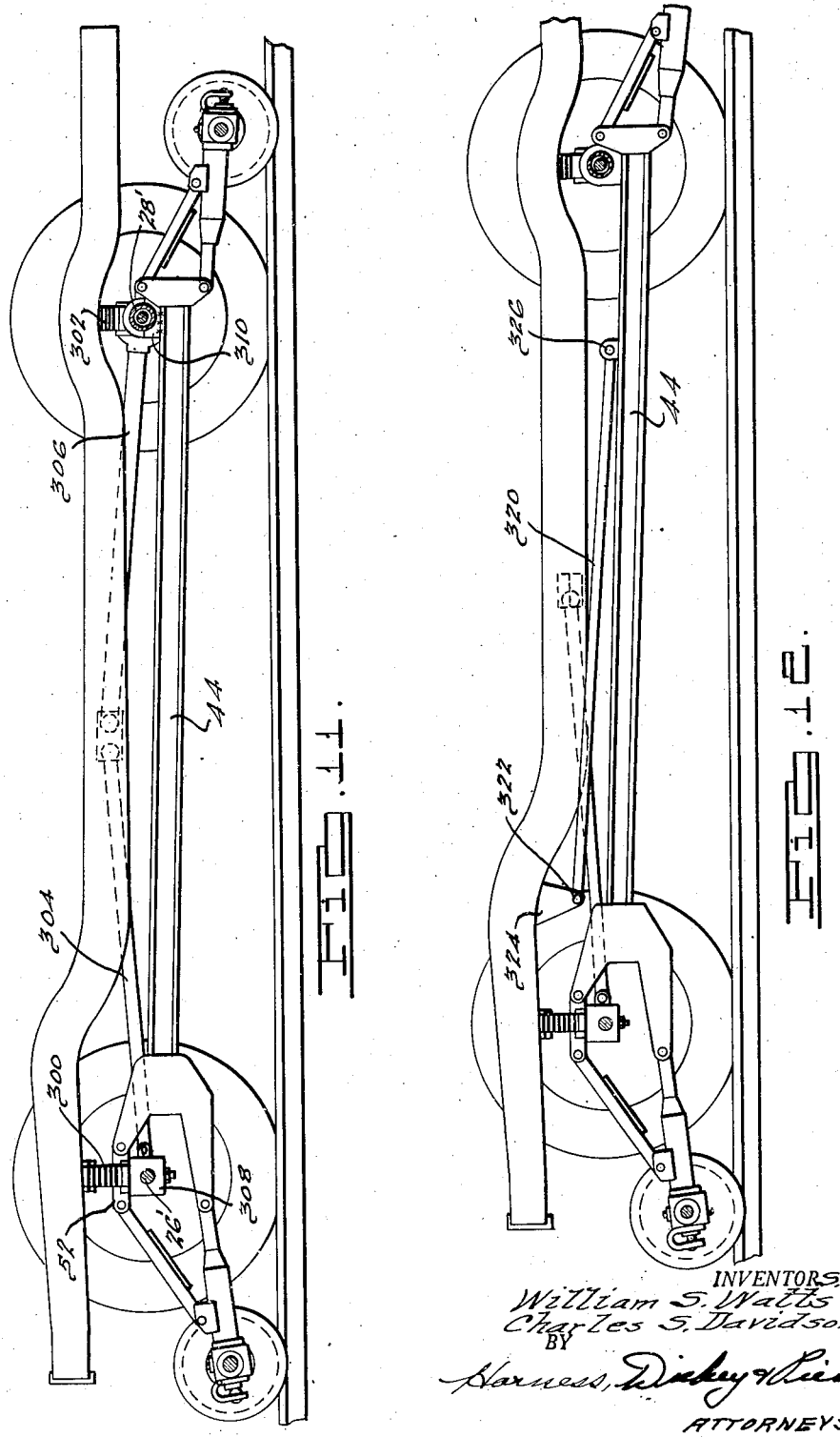
INVENTORS
William S. Watts
Charles S. Davidson
BY
Harness, Dickey & Pierce
ATTORNEYS.

Patented Aug. 9, 1949

2,478,647

UNITED STATES PATENT OFFICE 2,478,647

COMBINED ROAD AND RAIL VEHICLE

William S. Watts, Dearborn, and Charles S. Davidson, Detroit, Mich., assignors to Evans Products Company, Detroit, Mich., a corporation of Delaware Application July 15, 1944, Serial No. 545,131

21 Claims. (Cl. 105—215)

The present invention relates to vehicles adapted for both highway and rail travel, and more particularly to such vehicles comprising sets of main wheels which carry the entire vehicle load during highway travel and which, during rail travel, are guided upon the rails by, and share the load with, cooperating sets of pilot wheels. In certain of its aspects the present invention embodies, but provides improvements upon, the inventions described and claimed in the copending application of the present applicant, Watts, and Louis G. Carmick, Jr., Serial No. 545,132, filed July 15, 1944.

Principal objects of the present invention are to provide constructions of the above type, which are simple in arrangement, relatively light in weight, and low in cost; to provide such vehicles in which the pilot structure characterized as aforesaid, may be either permanently or removably applied to existing vehicle structures with a minimum of effort and expense; to provide such vehicles embodying improved means for transferring a desired portion of the vehicle load to the pilot wheels, and for immediately and directly increasing the transferred share when rounding curves and/or when braking the vehicle; to provide such constructions in which the pilot wheels, there being preferably at least one pair of such pilot wheels for each of the front and rear sets of main wheels, which are carried by a subframe structure formed in part at least by the axles for the main wheels; to provide such constructions in which the vehicle body is connected to the main wheels and the pilot wheels by suspension means common to such main and pilot wheels; and to provide such constructions in which the pilot wheels and the corresponding main wheels are spaced apart longitudinally of the vehicle and in which the aforesaid subframe structure cooperates in an improved manner in absorbing all or any desired part of overturning couples which would otherwise be applied to the suspension means when the pilot wheels are loaded.

Further objects of the present invention are to provide constructions of the aforesaid type in which the subframe structure incorporates, in addition to the main axles, a pair of laterally spaced longitudinal members secured to such axles adjacent the ends of such members, and which members support the pilot wheels and the axles therefor in an improved manner, said longitudinal members being sufficiently stiff or nonbendable to absorb all or any desired part of the aforesaid overturning couples; to provide such structures in which the longitudinal members are provided respectively with main axle receiving forks, one arm of each fork being secured to a corresponding main axle and both such arms serving as one leg of an improved triangular linkage which supports the corresponding pilot axle; to provide such construction in which one link of the aforesaid linkage is extensible so as to provide for raising and lowering movements of the corresponding pilot axle; and this extensible link is the one which gives the greatest pilot movement for a given change in length of the link; to provide such constructions in which a pair of pilot wheels is carried by an axle, in turn supported by triangular linkages arranged at opposite sides of the vehicle and in which a common operating means is afforded for simultaneously adjusting the linkages at both sides of the vehicle; to provide such constructions embodying improved means for affording a lost motion connection between the pilot and main wheel structures, said lost motion connection being preferably embodied in the extensible links of the aforesaid triangular linkages; and to provide such constructions embodying a shackle connection between the longitudinal subframe members and at least one of the cooperating main axles, so as to permit at least limited relative longitudinal movements between the main axles during the operation of the vehicle.

Further objects of the present invention are to provide constructions of the aforesaid type in which in certain embodiments, the subframe structure is independent of the vehicle body, being connected thereto only through the resilient suspension means which is common to the main and pilot wheels and which in certain other embodiments includes means which enables the subframe structure to constitute at least a part of the driving connection between the body and the main wheels.

With the above as well as other, and, in certain cases, more detailed, objects in view, preferred illustrative embodiments of the invention are shown in the accompanying drawings, throughout the several views of which corresponding reference characters are used to designate corresponding parts, and in which:

Figure 1 is a view in side elevation of a structure embodying the invention;

Figure 2 is a top plan view (in part broken away) of the structure of Figure 1, with the body structure of Figure 1 removed;

Figure 3 is an enlarged view of the improved supporting connection between the respective pairs of pilot wheels and their associated main wheels, taken along the line 3—3 of Figure 2;

Figure 4 is a fragmentary view in front elevation taken along the line 4—4 of Figure 3;

Figure 5 is a fragmentary view, taken along the line 5—5 of Figure 2;

Figure 6 is a view in vertical section, taken along the line 6—6 of Figure 5;

Figure 7 is a fragmentary view in section, taken along the line 7—7 of Figure 2;

Figure 8 is a fragmentary view in vertical section, taken along the line 8—8 of Figure 7;

Figure 9 is a sectional view of a modifiction of the invention;

Figure 10 is a fragmentary sectional view of a further modification of the invention;

Figure 11 is a sectional view of a further modification of the invention; and

Figure 12 is a fragmentary sectional view of an additional modification of the invention.

It will be appreciated from a complete understanding of the invention, that many of its features may be embodied in a wide variety of vehicles intended for operation both upon highways and upon rails, and that such features may be embodied in various different forms other than the forms specifically disclosed herein. By way of illustration but not of limitation, the invention is herein disclosed in connection with vehicles having main sets of pneumatic tired wheels which normally sustain the entire vehicle load during highway travel, and which, during rail travel, are guided upon the rails by, and share the vehicle load with, flanged pilot wheels.

Referring first to Figures 1 through 8, the vehicle is illustrated as comprising a body 20, herein shown as being a conventional chassis, it being understood that the term body is generically used to include those parts of the vehicle which, in a vehicle having a spring suspension, are conventionally referred to as the sprung parts as distinguished from the unsprung parts of the vehicle. The vehicle also includes longitudinally spaced pairs of main wheels 22 and 24, either of which, so far as concerns the present pilot structure, may be utilized as the front wheels, wheels 22 being specifically shown as the front wheels, and wheels 24 being specifically shown as the rear wheels. Wheels 22 and 24, both or either of which may be dirigible, are conventionally provided with main axles 26 and 28, both or either of which may be a driving axle. Both sets, or either set, of main wheels may be considered as being equipped with brake mechanism.

In the broader aspects of the invention, the suspension between the body and the main axles may be either rigid or resilient. In many cases, however, it is preferred to utilize a usual resilient suspension, herein illustrated as being afforded by usual semi-elliptic springs 30 and 32, it being understood that the springs 30 and 32 are arranged in pairs, and may be conventionally connected to the body 20 and to the corresponding main axles. It will further be understood that the springs 30 and 32 may and preferably do have the softness or relatively low spring rate which conventionally characterizes main vehicle suspensions.

In the preferred practice of the present invention, the suspension 30—32 is common to the main wheels 24—26 and to the pilot wheels 40—42. In the embodiment now being described, the connection between the pilot wheels and the suspension 30—32 comprises a subframe and cooperating linkages which, in substantial part, relieves the suspension 30—32 of the overturning couple which would otherwise be applied thereto when the pilot wheels are loaded, and which enables braking torques applied to the main axles to increase the loading of at least certain of the pilot wheels. These actions are discussed below, in connection with the description of the operation of the vehicle.

Continuing with the description of the present structure, the subframe comprises the two laterally spaced longitudinally extending frame members 44, which are preferably metallic, and may be of any suitable section. As shown, members 44 are of I section. Referring particularly to Figure 3, the front ends of members 44, are provided with forklike members 46, having legs 48 and 50, the outer ends of both whereof are bifurcated. Each leg 48 is pivotally connected by a pin 52 to a pad 54 which is received between the bifurcated portions of the corresponding leg. Each pad 52 is received between the associated spring 32 and the corresponding spring pad 56, and is held in place by the usual spring-retaining U-bolts. As shown, therefore, pads 52 are rigid with the corresponding main axle.

Referring particularly to Figures 5 and 6, the rear end of each side member 44 is connected by a suitable bracket 60, to a pair of short shackle links 62. Links 62 in turn are pivotally connected by a pin 64 to a pad 66. As shown, each pad 66 is rigid with respect to the rear main axle, being retained in place between the usual spring pad 68 and the associated spring 32 by means of the U-bolts 70.

As shown, the bracket 60 is made up of spaced pairs of side plates 61 and 63, which are welded together, plates 63 being also welded to the corresponding side member 44. The upper ends of plates 61 receive between them a pin 65, to which the lower ends of the previously mentioned links 62, and the hereinafter described arm 110, are connected. Similarly, the lower ends of plates 63 support a pin 69 to which the hereinafter described link 112 is pivotally connected.

From the foregoing it will be appreciated that in the present embodiment the subframe structure is comprised primarily of the side members 44 and the main axles 26 and 28, the connections between these members being such, by virtue of the links 62, as to permit limited relative movements, longitudinally of the vehicle, between main axles 26 and 28. As will be understood, these longitudinal movements are needed in order to accommodate the flexing action of the main suspension springs 30 and 32.

The respective pairs of pilot wheels 40 and 42 are provided with axles 80 which may be and preferably are identical, and a description of one whereof will consequently suffice for both.

Referring particularly to Figures 2, 3, 4, 7, and 8, each pilot axle 80 comprises a central section of square or box section, and a pair of wheel supporting trunnions 82. Each central section is made up of four platelike members 84, 86, 88, and 100, suitably secured together as by welding, indicated at 102. Adjacent each end thereof, the central body portion is provided with a block 104, which may be and preferably is welded in place therein, and which receives, with a press fit, the corresponding trunnion 82.

The pilot wheels are conventionally secured in place upon the trunnions 82, for rotation with respect thereto and may either be rigid, as shown, or may be arranged, in accordance with the disclosure of Nampa Patent No. 2,203,965, to incorporate sound deadening cushioning material which also imparts some resilience thereto. In the latter case the means which imparts the resilience to the pilot wheels will be recognized as having a substantially higher spring rate than those of the main suspension springs 30 and 32 and the main rubber tired wheels 22 and 24.

In the present instance, the front pilot axle 80 is connected to the previously described subframe structure by a pair of laterally spaced identical four-bar linkages, each comprising an upper arm 110, a lower arm 112, a pad 54, and a fourth link constituted by the fork 46. To enable the pilot wheels to be raised and lowered, each arm 112 is adjustable in length. Loads applied to the pilot wheels are transmitted through the just mentioned linkages which, as will be evident, engage the pilot axle at points immediately adjacent the respective pilot wheels.

Referring particularly to Figures 2, 3, 4, 7, and 8, each adjustable arm 112 comprises an outer sleevelike member 130 which slidably receives an inner tubular member 132, a conventional grease seal 134 and boot 136 being provided to protect the slidable connection between these members. The outer end of the inner member 132 is provided with a plug 140, and is laterally flattened as indicated at 142 so that it may be received between the bifurcated portions of the associated arm 50 or bracket 60, as the case may be. Pins 144 complete the pivotal connections between the portions 132 and the last mentioned members.

The outer end of each outer member 130 is provided with a flange 150 through which, by means of a series of circumferentially arranged bolts 152 and studs 154, member 130 is secured to the associated pilot axle. To reinforce the pilot axle in the regions of the arms 112, the former is provided with reinforcing plates 160 and 162, which may be and preferably are welded in place therein. The bolts 152 pass entirely through the pilot axle, the reinforcing plates 160 and 162, and also serve to secure the corresponding cap 164 in place. The studs 154 pass through apertures in the flange 150 and are threaded into the corresponding side of the pilot axle.

In order to slidably adjust the portions 130 and 132 so as to correspondingly adjust the length of the arm 112, the inner member 132 is provided with internal threads 170 which mate with correspondingly external threads on a screw 172 which is received within the member 132. The outer end of screw 172 projects outwardly of the associated pilot axle, through an aperture provided therefor in the previously mentioned cap 164, and terminates in a spheroidal portion 174, having laterally projecting pins 176, which adapt it for engagement by a usual cranklike tool 178.

Within the axle, member 172 is provided with a head constituted in part by a radial enlargement 180 which is integral therewith, and in part by a cooperating head portion 182 which is fitted over the reduced end 184 and is held in place thereon by a locking ring 186.

As will be evident, the head, comprising members 180 and 182, is received between the reinforcing plates 160 and 162, which are preferably provided with wear plates 190 and 192. Being narrower than the spacing between these wear plates, the head is enabled to have an unrestricted or free motion therebetween. This lost motion is of particular importance for reasons discussed below.

Intermediate its ends, each arm portion 130 is provided with a bifurcated bracket 200. The lower end of each arm 110 is pivotally connected to corresponding bracket 200 by means of a pin 202. The upper end of each arm 110 is pivotally connected by means of a pin 204, to the corresponding pad 54 or 66, as the case may be.

It is to be noted that the pins 52, 144, 202, and 204, are of substantial length, the same being true of the bearing openings in the corresponding arms and the spacing between the arms of the corresponding supporting portions. Thus the connections afforded thereby are able to maintain the corresponding pilot axles and main axles in alignment with each other transversely of the vehicle. It is preferred, however, to reinforce the subframe structure so as to better enable it to maintain such alignment. This may be done in various ways as, for example, by means of the cross members 210 and 212 shown in Figure 2 as extending between cooperating pairs of upper arms 110.

The rear pilot axle is connected to the subframe members 44, by a pair of transversely spaced identical three-bar linkages. Each such linkage comprises an upper arm 110, a lower arm 112 and the corresponding one of the previously mentioned brackets 61, it being understood that arms 110 and 112 may, and preferably do, have the same construction as the corresponding front arms. As in the case of the front pilot wheel mounting, pins 64, 65, 69, and 202 are of substantial length and are thus able to withstand substantial forces tending to move the pilot axle transversely of the vehicle. It is preferred to reinforce the linkages by means of the previously mentioned cross members 210.

A feature of the present invention is a common operating means or connection for simultaneously adjusting each one of the pair of extensible arms at the front of the vehicle and a similar common operating means at the rear of the vehicle.

Referring particularly to Figures 7 and 8, a sprocket 220 is associated with each rotatable screw 172, and, as shown, is screwed in place between the previously described head elements 180 and 182. Suitable means, such as one or more dowel pins 222, may be utilized to properly locate the sprocket between the head elements and to prevent relative rotation therebetween. A chain 224 is trained over the two sprockets associated with a particular pilot axle, and passes axially through the tubular pilot axle. Each screw 172 is provided with an operating head 174, which accommodates the previously mentioned tool 178, and it will be realized accordingly that the tool may be applied at either side of the vehicle to effect the corresponding raising and lowering movements.

A further feature of the invention resides in the provision of releasable locking means to prevent undesired rotation of the adjusting screws 172. As shown, such locking means comprises clips 230, one whereof is secured to the associated pilot axle adjacent at least one of the screw heads 174 therefor. Each clip 230 is provided with a slot 232 through which the head 174 may be projected when the pins 176 are in a substantially vertical position. When so disposed, the sides 234 of the slot cooperate with the pins 176 to prevent rotation of the screw. To enable an adjustment of the structure the clips 230 may readily be swung in a clockwise direction as viewed in Figure 3, to a position in which they do not interfere with the operation of the screws.

Considering now the operation of the above described structure, it will be appreciated that during normal highway travel, the pilot wheels 40 and 42 are elevated to positions such as are indicated in dotted lines in Figures 3 and 5, in which positions they give adequate road clearance. As will be understood the respective pairs of pilot wheels may be elevated to the just mentioned positions by rotating the associated screws 172 in a direction such as to lengthen the lower arms 112 of the corresponding linkages. During such elevating movements, the weight of the pilot wheels urges the members 132 and their associated screws 172 in a rightward direction as viewed in Figure 7, causing the faces of the head elements 182 to bear against the corresponding inner wear plates 192.

When so elevated, the pilot wheels and axles are firmly and positively held by their associated linkages, which linkages, it will be noted, are inherently rigid and permit only the amount of relative movement between a particular pilot wheel and its corresponding forks 46 or brackets 61, which is allowed by the lost motion connection between the associated screw 172 and its mounting. This lost motion is of particular importance in accommodating the vehicle to irregularities of the roadway. For example, assuming that a particular road wheel is driven up over an obstruction such as curbing, such road wheel is required to be elevated above its companion road wheel. This elevating movement compresses the corresponding main suspension spring 30 or 32, and also cocks the subframe to a certain extent, which cocking is permitted by the inherent resilience of the relatively long subframe members 44, and by the play in the subframe bearings resulting from normal manufacturing tolerances. This elevating movement also subjects the assembly comprising a pilot axle and its linkages to a similar cocking force. By virtue of the relatively short length of the links which make up the pilot wheel linkages, it is preferred not to rely on the just mentioned factors to accommodate such latter cocking force. Instead it is preferred to provide the aforesaid lost motion which is, of course, proportioned to be sufficient in amount to allow for all reasonable operating conditions, and which enable one or the other of the links 112 of the corresponding pair to become elongated sufficiently to accommodate the structure to the elevated position of such one road wheel. It will be understood that this lost motion is of value in the operation on the highway with the pilot wheels retracted as it permits the usual warping of the main vehicle frame without binding or undue stress in the aforesaid retraction linkages.

With the pilot wheels elevated, therefore, the vehicle functions as a conventional road vehicle having all of the normal riding characteristics except that the unsprung weight of the vehicle has been increased by an amount equal to the weight of the aforesaid pilot structure. A particular advantage of the present construction is that the elements making up the pilot structure, though of sufficient strength to produce a very sturdy rail vehicle, are relatively light in weight, and so do not increase the unsprung weight of the vehicle to an undesirable degree.

Considering now the operation of the vehicle upon the rails, it will be appreciated that after the road wheels have been aligned upon the rails 240 in accordance with conventional practice the adjustable arms 112 may be shortened to lower the pilot wheels to the full line rail engaging positions shown in Figures 1, 4, and 5. In this connection a particular advantage of providing the adjustment in the lower arm of each pilot wheel linkage is that a relatively large pilot wheel movement may be accomplished with a relatively small amount of change in the length of each arm 112.

The weight of the pilot wheels maintains the screw heads in engagement with the wear plates 192 until such time as the pilot wheels engage the rails. Thereafter, and until the screws 172 have been turned sufficiently far to cause the heads to travel the full line position shown in Figure 7, in which the outer wear plates 190 are engaged, the pilot wheels are loaded only to the extent of their own weight, the entire vehicle load being borne by the road wheels. As the adjusting movement is continued past such position, a progressively increasing proportion of the vehicle load is transferred from the road wheels to the pilot wheels, links 112 being loaded in tension and links 110 being loaded in compression. This transfer, of course, progressively reduces the deflection of the road wheel tires. By virtue of the well-known relatively high spring rate of pneumatic tires, it will be appreciated that a substantial fraction of the vehicle load can be transferred without requiring more than a very small change in tire deflection of the order, for example, of considerably less than one inch between full-load and no-load conditions. It will be appreciated that the higher the center of gravity of the vehicle, using this invention, the longer is the effective lever arm causing direct load transfer to the outside pilots during a turn. Also it will be understood that, in general, the center of gravity of the vehicle rises as it is loaded. Having in mind the many different types, designs, and heights to the centers of gravity of various vehicles, it will be understood that, for any given vehicle under particular operating conditions, there will be a desired minimum load to be maintained on the pilots, and this, by way of example only, may vary from around a quarter to more than half the vehicle load. Thus, in general, changes in tire deflections, due to pilot loadings, may be less than one-half inch. A practical measure of the amount of transferred load is, of course, provided by the increasing resistance to turning of the screws 172; and it is preferred to so proportion the cranklike tool 178 as to enable a workman, by exerting 80 or 100 pounds effort against the tool, to transfer a desired amount of vehicle load to the pilot wheels.

As will be recognized, the particular percentage of the vehicle load which it is desirable to transfer to the pilot wheels may be widely variable to suit different operating conditions. As the pilot wheel load is increased, the likelihood of derailment, tire wear, and the rolling resistance of the vehicle are reduced.

Independently of the degree to which the pilot wheels are loaded, it will be appreciated that the present construction is one wherein cooperating pairs of main road wheels and pilot wheels are connected to the vehicle through a suspension, in this case the main springs 30 and 32, which are common thereto. During operation of the vehicle upon the rails, therefore, the degree to which the pilot wheels are loaded is wholly independent of the degree to which such main springs may be deflected by vertically applied loads.

As will be recognized, with the construction now being described, the ratio in accordance with which the load is divided between a particular pair of pilot wheels and its corresponding pair of main wheels, for particular advanced positions of the corresponding screws 172, is determined by the relation between the relative resiliencies of three separate factors of the present suspension which are, (a) the resilience of the tires associated with the road wheels, (b) the resilience of the pilot wheel mounting, including the subframe, the associated linkages, and any resilience which is incorporated in the pilot wheels and (c) the resilience of the main suspension 30 or 32 with respect to overturning couples applied thereto. This situation can best be understood by a consideration of the forces acting on the system.

Considering first the front pilot wheels, it will be appreciated that as the associated screws 172 are advanced, in loading these pilot wheels, the associated links 112 and arms 50 are placed in tension. Links 110 on the other hand are placed in compression. Components of the latter forces stress pads 54 in compression and also stress arms 48 in compression. Forks 46 are consequently subjected to clockwise forces, as viewed in Figure 3, which forces are resisted by the relatively long and inherently somewhat springy side members 44. Thus, even though arms 112 and 110, forks 46 and pilot wheels 40 be regarded as rigid, the pilot wheel mounting as a whole may be regarded as being resilient. It should be particularly noted that the resiliency of this pilot mounting is materially different from the resiliency of usual vehicle springs, in that the spring rate of this mounting is of the order of magnitude of the spring rates of the rubber tires in their loaded condition. For example, a loaded tire deflection of one-half inch may correspond to a main spring deflection of four to five inches.

Vertical components of the forces applied through links 110 tend to rock pads 54 about pins 52 as centers thereby applying a non-normal stressing (in this case, an ogee deflection) to the main springs. As is well known, such springs are much stiffer in resisting ogee deflections than in resisting normal or vertical loadings. It should particularly be noted that pads 54 are relatively short in length, and that as the length of pads 54 are shortened, or more closely approach zero, the overturning couple applied to springs 30 is reduced.

Thus, as the screws 172 are turned, relative vertical movement between the pilot wheels and the main axle is resisted by the resistance to overturning couples of the main springs 30 and by the resistance to flexure of the pilot wheel mounting.

As the screws 172 are turned, shortening the links 112, the pilot wheels tends to move downwardly with respect to the main axle 26 or as stated otherwise, tend to cause the main axle 26 to rise, thereby decreasing the deflection of the main wheel tires and consequently relieving the load on the main wheels. The forces tending to cause the just mentioned downward movement of the pilot wheels relative to the main axle are transmitted through the pilot wheel mounting and the main springs 30. To the extent that the latter two factors yield, continued turning of the screws produces only flexure of the pilot wheel mounting and overturning of the main springs 30 and do not produce the relative vertical movement of the pilot wheels relative to the main axle. It will thus be appreciated that the exact proportion of the vehicle load, which is transferred to the pilot wheels for a given position of the screws 172, depends upon the relation between the spring rates of the main tires on the one hand and the pilot wheel mounting and main springs (in respect to overturning forces) on the other hand. Although pneumatic tires have relatively high spring rates, it will be recognized that it may be expected that the latter two factors have a combined spring rate which is at least as great as that of the tires. Preferably the system is so adjusted that the spring rate of the latter two factors is considerably in excess of the spring rate of the tires, it being borne in mind that the main springs 32, though relatively soft with respect to vertical forces, are very stiff with respect to overturning forces.

The analysis with respect to the loading of the rear pilot wheels is much the same as that discussed above. Namely, the advancing movement of the associated screws stress links 112 in tension and stress links 110 in compression, thereby subjecting brackets 60 to counterclockwise forces, which are resisted by the relatively long side frame members 44. The vertical force on the main axle resulting from the tendency of the pilot wheels to move downwardly with respect to the main axle, is transmitted through the links 62. These forces, acting through lever arms determined by the substantially horizontal distance from the main axle 28 to the pivots 64, subjects the main springs 32 to an overturning couple. The load is divided accordingly between the rear pilot wheels and the rear road wheels on the same basis that such load is divided between the front pilot and road wheels.

Considering now the operation of automatically and immediately increasing the load on at least the outside pilot wheels in rounding a curve, it will be understood that as the vehicle enters a curve, the body structure is immediately subjected to a centrifugal force which produces an increase in the loading of the outside main suspension springs and correspondingly decreases the loading on the inside main suspension springs. This increase in loading of the outside suspension tends to increase the deflection of the tires of the outside road wheels. Assuming that the mounting between a particular pilot wheel and its corresponding road wheel is rigid, as distinguished from resilient, it will be appreciated that such pilot wheel positively resists the downward movement of the corresponding end of the associated main axle, which would be needed to increase such tire deflection. The increase in loading on the outside of the vehicle, therefore, instead of being transferred to the outside road wheels would be immediately and entirely transferred to the outside pilot wheels. This increase in load serves to positively prevent the centrifugal forces acting on the vehicle from causing the outside pilot wheels to ride up the rail edges on their flanges and become derailed. This increase in loading also is entirely proportional to the magnitude of the centrifugal force acting on the vehicle. Stated another way, the greater the centrifugal force or the sharper the curve, the greater is the load transfer.

As discussed above, the main suspension springs are resilient in respect to overturning couples, and the subframe members 44 may be expected to be at least somewhat resilient. In addition, in many cases, as previously mentioned, some resiliency may be introduced into the pilot wheels themselves and/or into the linkages. In a practical sense, therefore, the pilot wheels may be regarded as connected to the main suspension through means having some resiliency and the main road wheels are, of course, connected to the main suspension through the resilient tires.

In the presence of a change in the vehicle loading, therefore, the exact degree to which such change is divided between a particular pilot wheel and its corresponding road wheel is determined by the ratio between the same factors as are discussed above in connection with the description of the operation of initially loading the pilot wheels.

It will be understood that as the vehicle enters a curve, and its load center shifts to the outside, the load on the inside main and pilot wheels is decreased. The lost motion, previously described, enables the inside tire deflection to decrease without decreasing the inside pilot wheel load to a value less than is represented by its own weight. This is for the reason that as the inside end of the main axle rises, the head of the corresponding screw 172 can, if necessary, move away from the outside wear plate towards the inside wear plate.

Under such conditions, the load on the inside pilot wheels is usually maintained at a value somewhat above its own weight. This is for the reason that although no load be applied to the inside pilot through the inside triangular linkage, a fraction of the load applied through the outside linkage is transmitted through the pilot axle to the inside pilot wheel in the ratio of the distance from the outside pilot wheel to its adjacent loading point and the spacing between the two pilot wheels. This fraction is thus a relatively minor one, because the triangular linkages engage the pilot axles at points immediately adjacent the ends thereof; thus the major part of the load transfer to the pilot wheels is taken by the outside pilot wheels. This is an important advantage resulting from application of pilot loads at points near the pilot wheels, or near the ends of the pilot axles where, as here, pilot axles are employed. In this connection, it is to be borne in mind that it is equally important that the pilot loads be transferred from the main suspension or from the road wheels at points close to the road wheels. Another important advantage of this loading arrangement is that it is possible to use relatively light pilot axles, as distinguished from the relatively rugged pilot axles which are required in constructions in which pilot axle loads are applied at the centers thereof.

Continuing with the operation, it will be noted that the shackle connection between one main axle, in this case the rear axle, and the pilot subframe readily accommodates the relative movements of the main axles longitudinally of the vehicle which normally accompany springing movements of the main suspension springs. The "breathing" thus afforded by the subframe does not interfere, however, with its important function of balancing out, at least in a large part, the overturning couples which would otherwise be transmitted to the main suspension by virtue of the loading of the pilot wheel.

A further and very important advantage of the above described construction is that braking loads applied to the main road wheels increase the loading of those pilot wheels which are in advance of the braked road wheels. Thus, if the brakes are applied when the vehicle is moving ahead, the load on the front pilot wheels is increased. If the vehicle is braked while operating in a reverse direction, the load on the rear pilot wheels is increased, such pilot wheels being in a leading position under the conditions stated. The advantages of this feature will be apparent upon recognition of the fact that vehicle operators, entering a turn at an excessive speed, may be expected to apply the vehicle brakes. Such action increases the leading pilot wheel load by an amount proportional to the degree of braking effort, which increase is in addition to the automatic increase which results from rounding the curve, and which is described above.

More particularly, and referring to Figure 3, it will be appreciated that a braking load applied to the front wheels 22 during forward vehicle travel, applies a counterclockwise torque to the corresponding axle 26. This torque serves to place links 110 in compression and to place links 112 in tension, and is resisted by the resistance of the main springs 30. To the extent that such springs 30 yield, therefore, pilot wheels 40 move downward with respect to the main axle 26. This downward movement reduces the tire deflection and increases the pilot wheel loading by an amount equal to the change in load represented by such change in deflection. It will be noted that the change in pilot wheel loading, due solely to braking effects, is shared equally by the inside and outside pilot wheels.

The analysis with respect to the increase in loading of the rear pilot wheels during reverse operation of the vehicle is obviously the same. It will be noted that in the illustrated embodiment the load is relieved, by braking effects, from pilot wheels which are trailing with respect to the corresponding road wheels, which factor is, however, unimportant since, under the conditions stated, the primary guiding effect is obtained from the leading pilot wheels.

It will be recalled from previous discussion that the degree to which the main springs 30—32 are required to absorb overturning couples depends upon the horizontal spacings between the respective axles 26 and 28, and their associated pivots 52 and 64. Similar comments apply to the increase in pilot loading which results from braking operations. Thus, these horizontal spacings are determined by the requirements of the particular vehicle in respect to the just mentioned axle-overturning and braking factors.

The construction shown in Figure 9 distinguishes from that shown in Figures 1 through 8 primarily in that additional links 250 and 252 have been added, which, without complicating the mounting of the pilot structure, serve to materially reduce the effect of overturning couples on the main suspension springs 30 and 32. Correspondingly, this construction reduces the change in pilot loading which results from braking operations.

The links 250, one whereof is provided at each side of the front end of the structure, are pivotally connected to the previously mentioned pins 144 and 204 at the corresponding side of the vehicle, and may very readily be added as an incident to the assembly of the previously described structure. As will be obvious, links 250 serve to provide each corresponding pilot wheel with a rigid triangular connection (links 250—110—112) to the associated subframe. Assuming that the associated subframe structure is rigid, it will be appreciated that loads applied to the front pilot wheels subject pads 54, and consequently springs 30, to only substantially vertical loads. Recognizing that the subframe members 44 have some resilience in the construction shown, such pilot wheel loading is enabled to flex the subframe members 44 to some extent. To such extent, the pilot wheel loading applies an overturning couple to the main axle 26. In the instance being described accordingly the resilient subframe acts in parallel with the main springs 30 in resisting overturning couples, the same as in Figures 1 through 8. It will of course be recognized that such overturning couple may be eliminated by providing a pivotal connection between the subframe and the axle structure, the pivotal center being the axis of the axle structure.

The links 252 are pivotally connected by pins 251 and 253 to the respective pads 66, and bearing bosses 255 which are secured to the corresponding subframe members 44. Each pair of links 252—62, thus acts as a parallel link system, and except as modified by flexure of the subframe members 44, due to loading the rear pilot wheels, such loadings are applied to the rear suspension springs 32 only as substantially vertical forces. The analysis given for the front end of the vehicle thus applies to the rear end.

It will be appreciated that in a generic sense the screw driven operating mechanisms for the triangular linkages, described above, are illustrative of various different mechanisms which can be utilized. A modified operating mechanism is illustrated in Figure 10, in which the upper arm 110' of each triangular linkage is pivoted to the pad 54 as previously described, and is rigidly connected at 260 to the corresponding pilot axle 80. The corresponding subframe member 44 serves as a mounting for a fluid pressure operated ram 262, the piston rod 264 whereof is pivotally connected to a lever 266 which is keyed to a countershaft 268 which extends across the corresponding end of the vehicle and is journaled in the bearing openings provided in the respective fork arms 50.

Also keyed to countershaft 268 are a pair of levers 270, one for each pilot wheel, which levers are in turn pivotally connected to levers 272. Levers 272 are pivotally connected to the pilot axle 80 immediately adjacent the ends thereof respectively.

With this arrangement it will be appreciated that a leftward movement of the piston rod 264 rocks levers 270 counterclockwise enabling them, through levers 272, to bring the pilot wheels to the rail engaging position. A reverse movement, of course, elevates the pilot wheels and it will be understood that the pilot wheels may be loaded to a degree determined by the pressures in the ram 262. It will be appreciated that similar ram operated mechanisms may be utilized at both ends of the vehicle, a floating connection being provided at one end in the manner described above. It will be recognized that with the suspensions shown in Figures 1 through 9, any desired vehicle drive connection between the engine (not shown) and the driving wheels may be utilized, it being preferred to utilize the familiar Hotchkiss drive. It is within the purview of the present invention to apply the previously described pilot structure to vehicles employing other types of suspensions and adapted to utilize other drives. For example, the structure shown in Figure 11 is characteristic of suspensions in which the resilient elements of the suspension are not capable of withstanding substantial overturning couples, or of transmitting driving forces from the wheels to the body. Specifically, the construction of Figure 11 is of the familiar type utilized on Ford and other vehicles, and employs transverse front and rear springs 300 and 302. In this case, the suspension is completed by usual front radius rods 304, and by a usual torque tube 306. The connection between the front and rear axle structures 26 and 28' is the same as before, with the exception that in this case the front pads 52 are secured to the front axle 26' by blocks 308; and the rear end of the pilot structure is secured to the rear axle structure 28' by means of a connecting member 310 which surrounds the rear axle housing. In the broader aspects of the invention, members 308 and 310 may be either rigid with or pivotally secured to the corresponding axle structures. In the former instance, as will be understood, pilot wheel loadings apply some forces to the main suspension, and in the latter instance, the pilot structure entirely relieves the main suspension of overturning couples.

It will also be recognized that with the structure now being described, the subframe members 44 reinforce the cooperating suspension members 304 and 306 and thus, in a sense, may be regarded as composing a part of the main vehicle suspension. This fact makes it possible, in the broader aspects of the invention, to replace the above mentioned torque tube 306, with other types of drive, for example the double jointed drive shaft employed in connection with Hotchkiss drives.

Figure 12 illustrates the just mentioned departure from Figure 11. In Figure 12 the driving connection between the rear, and in this case, the driving wheels, is afforded by radius rods 320, which are pivotally connected by means of pins 322 to frame brackets 324, and are also pivotally connected, by pins 326, to the corresponding subframe members 44. Preferably one of the rods 320 is provided at each side of the vehicle. With this construction, the engine connection to the rear axle is required only to transmit driving torque thereto, and is not required to transmit driving force to the body. Here, as in Fig. 11, rising and falling of the body relative to the subframe will cause some twisting of the main springs, which is readily accommodated by the conventional transverse springs shown, or by the use of rubber, as is well understood.

It will be appreciated that in the broader aspects of the present invention, any of a variety of expedients may be utilized to lock the dirigible vehicle wheels in straight ahead position during rail travel; a simple and readily applied locking structure being illustrated in Figure 1. Referring to Figure 1, one or the other of the previously described forks 46 is provided with a swingably mounted arm 330 which carries a pair of spaced plates 332. Under normal conditions link 330 hangs idly in the position shown. To condition the vehicle for rail travel, the link 330 may be swung counterclockwise to a position in which the plates 332 embrace the usual steering tie rod 334 and prevent any movement thereof fore and aft of the vehicle. Such action, of course, locks the front wheels in substantially straight-ahead position.

Although only a limited number of embodiments of the present invention have been described in detail herein, it will be appreciated that various further modifications in the form, number and arrangement of the parts may be made without departing from the spirit and scope of the invention.

What is claimed is:

1. In a combined road and rail vehicle having a resilient suspension supporting road wheels with pneumatic tires to also operate on rails, means including at least one pair of pilot wheels associated with said road wheels to operate in tandem therewith to guide the vehicle during rail travel, means materially stiffer than said suspension connecting said pilot wheels to said road wheels including adjustable means, adjustment whereof causes said pilot wheels to move between retracted and rail engaging positions, said adjustable means including lost motion means affording a substantial but limited and substantially free one-way connection which enables limited relative vertical movement between said pilot wheels and their corresponding road wheels whereby when the pilot wheels are in rail engaging position and at the end of lost motion travel there is a direct transfer of vehicle load through said suspension to said pilot wheels upon increase in vehicle load on wheels on one side of the vehicle, as when rounding a turn, said lost motion being sufficient in extent to insure that reductions in tire deflection on the other side of the vehicle, when rounding a turn, will not raise the pilot wheel on such other side.

2. The vehicle of claim 1, including an axle for said pilot wheels, and wherein said adjustable means act against the axle at spaced points adjacent the ends of the pilot axle.

3. For use in adapting a road vehicle, having a resilient suspension supported on road wheels with pneumatic tires for rail or road travel, a pilot structure including at least one pair of pilot wheels for guiding the road wheels during rail travel, sub-frame means connecting said pilot wheels to said road wheels including adjustable means, adjustment whereof causes said pilot wheels to move between retracted and rail engaging positions, said adjustable means including means affording a limited but substantial and substantially free one-way connection which enables limited relative vertical movement between said pilot wheels in rail engaging position and their corresponding road wheels to prevent decreased pneumatic tire deflection raising a lowered pilot wheel, said sub-frame being so stiff that its spring rate is at least as great as that of said pneumatic tires.

4. In a combined road and rail vehicle, a body structure, means adapting the vehicle for road travel including at least two longitudinally spaced pairs of laterally spaced resilient road wheels and axle means therefor, means forming a suspension between said just-mentioned means and said body, pilot structure for guiding the vehicle during rail travel and including at least one pair of pilot wheels and an axle means therefor, said pilot wheels being adapted to run upon the rails in tandem with, and to share a predetermined portion of the load with, said road wheels, mounting means for said pilot wheels, said mounting means including elongated side frame members extending between, and supported by, the axle means for at least two pairs of said road wheels and means operatively connected to the pilot axle means at spaced points adjacent its ends for transferring load through said mounting means to said pilot wheels so that during normal rail travel said road and pilot wheels divide the vehicle load from said suspension and so that changes in the load on the road wheels at one side of the vehicle correspondingly change the loading on the said pilot wheel at the same side of the vehicle, said mounting means including means to move said pilot wheels to inoperative road travel position, in raised relation to said side frame members.

5. In a combined road and rail vehicle, a body structure, means adapting the vehicle for road travel including at least two longitudinally spaced pairs of laterally spaced resilient road wheels and axle means therefor, means forming a resilient suspension between said just-mentioned means and said body, pilot structure for guiding the vehicle during rail travel and including at least one pair of pilot wheels and an axle means therefor, said pilot wheels being adapted to run upon the rails in tandem with, and to share a predetermined portion of the load with, said road wheels, mounting means for said pilot wheels, said mounting means including elongated side frame members extending between, supported by and so connected to the axle means for at least two pairs of said road wheels that said side frame members with said road axle means form a relatively stiff rectangular subframe resisting relative tilting of said axle means or relative tilting of said side frame members and which are operatively connected to the pilot axle means at spaced points adjacent its ends for transferring load from said resilient suspension directly through said mounting means to said pilot wheels so that during normal rail travel said road and pilot wheels divide the vehicle load from said suspension, said mounting means being so stiff that its total spring rate is at least as great as that of said pneumatic tires, whereby increases in tire deflection, of a road wheel at one side of the vehicle, due to increased load on such side, as in rounding a turn, necessarily result in at least one-half of said increased load being transmitted directly to a pilot wheel on such one side of the vehicle, and said mounting means including means to move said pilot wheels to inoperative road travel position in raised relation to said side frame members.

6. In a combined road and rail vehicle, a body structure, means adapting the vehicle for road travel including at least two pairs of laterally spaced high rate resilient road wheels and axle means therefor, means forming a relatively low rate and long travel resilient suspension between said first-mentioned means and said body, pilot structure for guiding the vehicle during rail travel and including at least two longitudinally spaced pairs of pilot wheels and axle means therefor corresponding to and positioned adjacent to said two pairs of road wheels, said pilot wheels being adapted to run upon the rails in tandem with, and to share a predetermined portion of the vehicle load with, said road wheels, mounting means for said pilot wheels, said mounting means including elongated side frame members extending between and supported by at least two of the road axle means and means operatively connected to the two pilot axle means at spaced points adjacent their ends for transferring in normal operation a predetermined vehicle load from said common resilient suspension through said mounting means to said pilot wheels, said elongated members being relatively stiff in flexure to resist upward motion of said pilot wheels relative to said road axle means and for similarly transferring extra load to the outside pilot wheels during a turn on the rails, and said mounting means also including means to move said pilot axle means and pilot wheels to an inoperative position for road travel in raised relation to said side frame members.

7. In a combined road and rail vehicle, a body structure, means adapting the vehicle for road travel including at least two pairs of laterally spaced high rate resilient road wheels and axle means therefor, means forming a relatively low rate and long travel resilient suspension between said first-mentioned means and said body, pilot structure for guiding the vehicle during rail travel and including at least two longitudinally spaced pairs of pilot wheels and axle means therefor corresponding to and positioned adjacent to said two pairs of road wheels, said pilot wheels being adapted to run upon the rails in tandem with, and to share a predetermined portion of the vehicle load with, said road wheels, mounting means for said pilot wheels, said mounting means including elongated side frame members extending between and supported by and connected to at least two of the road axle means to form therewith a relatively rigid subframe moving with said road axle means and means operatively connected to the two pilot axle means at spaced points adjacent their ends for transferring in normal operation a predetermined vehicle load from said common resilient suspension through said mounting means to said pilot wheels, said elongated members being relatively stiff in flexure to resist upward motion of said pilot wheels relative to said road axle means and for similarly transferring extra load to the outside pilot wheels during a turn on the rails, and said mounting means also including means to move said pilot axle means and pilot wheels to an inoperative position for road travel in raised relation to said side frame members.

8. In a combined road and rail vehicle having a body, means including pairs of resilient road wheels for carrying the vehicle load during road travel, means including resilient suspension means for connecting said road wheels to the body, pilot structure for guiding the vehicle during rail travel, and comprising at least one pair of pilot wheels, and an axle therefor, for each pair of road wheels, loading means connected to the suspension means including means acting at spaced points adjacent the ends of said pilot axle for applying a portion of the vehicle load through said suspension means to said pilot wheels, said loading means being arranged so that said loading of the pilot wheels applies a reactive force to said suspension means in a non-normal direction which differs from the direction in which the body acts on said suspension means.

9. The structure of claim 8 wherein said loading means includes resilient means.

10. The structure of claim 8 wherein said loading means includes resilient means, and wherein the connection between the loading means and the suspension means is such that the said resilient loading means acts in parallel with said suspension means in absorbing such reactive force.

11. The structure of claim 8 wherein said loading means includes resilient means, and wherein the connection between the loading means and the suspension means is pivotal.

12. The structure of claim 8 wherein at least certain of said road wheels are provided with braking means which load said suspension means in said non-normal direction, whereby such braking forces are enabled to vary the loading of the pilot wheels.

13. Structure of claim 8 wherein said suspension means include semi-elliptic springs and said non-normal loading is an ogee loading thereof.

14. Pilot structure for converting a road vehicle for rail travel, said vehicle having a body, means including pairs of road wheels for carrying the body during rail travel, and means including resilient suspension means for connecting the road wheels to the body, said pilot structure comprising at least one pair of pilot wheels, and an axle therefor, for each pair of road wheels, loading means connected to movable end of the suspension means including means acting at spaced points adjacent the ends of said pilot axle for applying a portion of the vehicle load through said suspension means to said pilot wheels, said loading means being arranged so that said loading of the pilot wheels applies a reactive force to said suspension means in a non-normal direction which differs from the direction in which the body acts on said suspension means.

15. In a combined road and rail vehicle having a body, pairs of road wheels spaced lengthwise of the vehicle, suspension means including pairs of resilient means individual to the pairs of road wheels for connecting the road wheels to the body in such relation as to permit a small and limited relative movement of the pairs of wheels in a direction lengthwise of the vehicle, pilot structure for guiding the vehicle during rail travel and comprising pilot wheels and a subframe therefor, and means including shackle connections for connecting the subframe to the suspension means and for vertically transferring at least a substantial portion of the vehicle load through the suspension means to the pilot wheels, said shackle connections serving to accommodate said small relative movement.

16. Structure for adapting a road vehicle for rail travel, said vehicle having a body, spaced pairs of road wheels and suspension means including pairs of resilient means individual to the pairs of road wheels for connecting the road wheels to the body in such relation as to permit relative movement of the pairs of wheels lengthwise of the vehicle, said structure comprising pilot wheels and a subframe therefor, and means including shackle connections for connecting the subframe to the suspension means and for vertically transferring at least a substantial portion of the vehicle load through the suspension means to the pilot wheels, said shackle connections serving to accommodate said relative movement.

17. The structure of claim 16 wherein the pilot structure includes means for applying load to the pilot wheels from the suspension means.

18. The structure of claim 15 wherein the subframe is shackled to one pair of suspension means and is pivotally connected to the other pair.

19. The structure of claim 15 wherein the subframe is shackled to one pair of suspension means and is adjustably but rigidly connected to the other pair when the pilot wheels are in rail engaging position.

20. In a combined road and rail vehicle having a body, at least four road wheels arranged in front and rear pairs, front and rear resilient suspension means for connecting the road wheels to the body, said resilient suspension means not being adapted to sustain substantial overturning couples, pilot structure for guiding the vehicle during rail travel and including at least a pair of pilot wheels, a subframe for carrying and transmitting load to the pilot wheels, and means connecting the subframe to the respective front and rear suspension means in such relation as to enable the subframe to absorb overturning couples applied to such suspension means.

21. In a combined road and rail vehicle having a body, at least four road wheels arranged in front and rear pairs, front and rear resilient suspension means for connecting the road wheels to the body, said resilient suspension means not being adapted to afford a substantial driving connection between the road wheels and the vehicle, pilot structure for guiding the vehicle during rail travel and including at least a pair of pilot wheels, a subframe for carrying the pilot wheels and transmitting load thereto, means connecting the subframe to the respective front and rear suspension means, and means connecting the pilot structure to the body so as to afford a said driving connection.

WILLIAM S. WATTS.
CHARLES S. DAVIDSON.

REFERENCES CITED

The following references are of record in the file of this patent:

UNITED STATES PATENTS

| Number | Name | Date |
|---|---|---|
| 352,306 | Dickinson | Nov. 9, 1886 |
| 1,446,784 | Carter | Feb. 27, 1923 |
| 1,716,005 | Ridley | June 4, 1929 |
| 1,801,469 | Wagner | Apr. 21, 1931 |
| 2,116,797 | Nampa | May 10, 1938 |
| 2,140,421 | Fageol | Dec. 13, 1938 |

FOREIGN PATENTS

| Number | Country | Date |
|---|---|---|
| 323,247 | Germany | July 19, 1920 |